United States Patent [19]

Müller

[11] 3,937,409
[45] Feb. 10, 1976

[54] ELECTRIC DRIVE FOR FIBER OR THREAD WINDING MACHINES AND METHOD OF OPERATING WINDING MACHINES

[75] Inventor: Artur Müller, Karlsruhe, Germany

[73] Assignee: Industrie Werke Karlsruhe Augsburg AG, Germany

[22] Filed: Apr. 10, 1974

[21] Appl. No.: 459,577

[30] Foreign Application Priority Data
Apr. 16, 1973 Germany............................ 2319128

[52] U.S. Cl.......... 242/18 R; 242/18 DD; 242/43 R
[51] Int. Cl.²................... B65H 54/02; B65H 54/40
[58] Field of Search......... 242/18 R, 18 DD, 18 CS, 242/18.1, 43, 45

[56] References Cited
UNITED STATES PATENTS

| | | | |
|---|---|---|---|
| 2,509,250 | 5/1950 | Roberts................................ | 242/45 |
| 2,752,105 | 6/1956 | Keith .................................... | 242/45 |
| 2,763,824 | 9/1956 | Bacheler......................... | 242/18.1 X |
| 3,193,209 | 7/1965 | Hambach.......................... | 242/18 R |
| 3,235,191 | 2/1966 | Engelman et al.................. | 242/18.1 |
| 3,615,060 | 10/1971 | Jenny................................. | 242/26 X |
| 3,638,872 | 2/1972 | Jennings............................ | 242/18.1 |

*Primary Examiner*—Stanley N. Gilreath
*Attorney, Agent, or Firm*—McGlew and Tuttle

[57] ABSTRACT

An apparatus for driving winding devices, such as bobbins and their associated thread guide changers at constant proportional speeds, particularly fiber and thread winders, comprises a drive motor which has a rotatable shaft with an armature winding and a commutator connected to said armature winding for direct current connection from a DC supply to the armature, and which also includes a plurality of slip rings connected to the armature so that a symmetrical polyphase alternating current voltage is applied to the rings during the operation of the motor. The motor shaft is adapted to be connected either to a friction roller for surface driving of a bobbin or directly to a bobbin shaft for rotating the bobbin shaft. A synchronous motor having a rotatable shaft is connected to rotate a thread guide or traverse system and it is powered by power supplied from the slip rings to the synchronous motor. During operation of the drive motor, the slip rings deliver AC voltage at a frequency which is directly proportional to the mechanical rotational speed of the drive motor shaft so that the traverse system is driven at a speed constantly proportional to the speed of rotation of the drive motor shaft. The method involves the use of a modified DC motor connected to supply an AC voltage at slip rings thereon during its operation and comprises rotating the motor to drive a winding shaft and connecting the slip rings of the motor to supply an output voltage to a synchronous motor to drive a second shaft at a constant proportional speed to the winding shaft.

11 Claims, 10 Drawing Figures

ELECTRIC DRIVE FOR FIBER OR THREAD WINDING MACHINES AND METHOD OF OPERATING WINDING MACHINES

FIELD AND BACKGROUND OF THE INVENTION

This invention relates in general to the construction of drives for winding machines and, in particular to a new and useful apparatus and method for electrical drive of a rotatable winding shaft and a rotatable traverse system roller so that they are driven at uniformly proportional constant speeds, and to a method of applying a modified DC motor and AC generator for driving winding devices.

DESCRIPTION OF THE PRIOR ART

The present invention relates to an electric drive for winding devices operating at constant speeds, particularly for winders of synthetic fibers or the like. In the manufacture and further treatment of synthetic fibers, permanently increasing performances are required which, as a rule, can be obtained only by increased speeds. This results from requirements to further rationalize the manufacturing methods and also to largely replace handwork by automatic devices. To meet such requirements, relatively heavy demands are made on the drives and on the winding technique. As far as the technological properties of the material is concerned, a high degree of flexibility is expected. The present invention is primarily directed to the problem of creating preliminary driving conditions complying with increased winding speeds, a higher flexibility of the material, and the automation of the operations.

In the manufacture or treatment of synthetic fibers, the winding process may be characterized substantially in that the thread is fed from the spinning section at a constant speed and, consequently, spooled or wound up also at a constant speed. In conventional machines, the winding speeds are of the order of about 1000 to 2000 m/min; in high speed spinning processes, the speeds are between 2000 and 4000 m/min. In the future, requirements for winding speeds of the order of 6000 to 9000 m/min are to be expected permitting the manufacture of finished stretched threads of synthetic fiber in a direct process.

The following two driving systems are commonly used for the winding of threads of synthetic fiber at constant speeds:

1. Axially driven winders

In these devices, the bobbin is driven directly from the spool-axis side. The rotational speed of the bobbin must be decreased as a function of the increasing diameter thereof to obtain and keep a constant winding speed.

2. Surface driven winders

In this system of driving, the bobbin is driven by means of a friction cylinder rotating at a constant circumferential speed. Both of the winding systems have certain well known properties and, as may be expected, different advantages and disadvantages.

For forming self-supporting packages on a tube, which are generally called cheeses, a traverse system is needed for reciprocating the thread or threads transversely along the tube so as to finally obtain a cylindrical roll.

In the axially driven winders, basically two possibilities of transversely reciprocating the thread are given. The first possibility is to drive the carrier shaft of the bobbin through a transmission known in itself, off the drive of the winding machine. A "precision bobbin" is thereby obtained. It is understood, however, that a fixed proportion must be provided between the speed of the traverse system and the bobbin so that, with the decreasing speed of the bobbin, the operational speed of the changer is also reduced. The other possibility is given by the fact that, in some cases, a "scramble winding" is desired. Such a winding is obtained by keeping a constant speed of the traverse recirpocating motion of the thread during the entire period of winding. For this purpose, the traverse system is driven by a separate and usually additional driving mechanism.

In axially driven winders for precision winding, the traverse system is driven by means of a mechanical transmission off the carrier shaft of the bobbin. This transmission usually comprises either a mobile toothed belt or a cardan shaft because, in such cases, with the increasing diameter of the bobbin, the changer must be moved away from the bobbin axis. In view of the requirement to transmit speeds in the range of 1000 to 6000 rpm, such transmissions are relatively expensive and susceptible to troubles. Also, such transmissions produce undesirable oscillations. Mobile belt drives, on the other hand, produce oscillations of the mobile rollers due to the belt fluttering.

Another drawback peculiar to the known axial winders is that they practically do not permit a "scramble winding", i.e., a winding in which the changer is driven separately because this would require a substantially different design. For this reason, and also for lack of space, an axially driven winder suitable for both the "precision winding" and the "scramble winding" has not yet been designed. As a rule, the axial winders are used only for "precision windings".

A further shortcoming of the known axial winders is that at the start of the winding, i.e., while the thread or threads are set to the empty bobbin tube, the circumferential speed of the tube is not equal to the feeding speed of the thread. This frequently results in repeated attempts to set the thread or to position the yarn on the bobbin tube, which are usually ineffective because the thread breaks even at slight differences of speed. If the initial speed of the bobbin tube is too high, the thread tears, and if the tube speed is too low, the thread breaks. The explanation of this phenomenon is to be seen in the fact that the length difference which is not drawn off becomes entangled and causes a rupture of the thread. Thus, it is relatively difficult to adjust an exact speed of the tube. In addition, the bobbin drive is a variable speed drive and is designed mostly as a thread-tension controlled device. Such a device is effective only after an equilibrium of forces has been established between the thread and the control mechanism. This presupposes an initial winding of the thread effected for some seconds. The thiner the thread and higher the speed, the more difficult and uncertain becomes the feeding in of the thread.

To remedy these disadvantages, solutions have been considered to impart the desired speed to the bobbin tube at the start of the winding operation. To this end, it is necessary to drive the bobbin axis during the starting period by means of a synchronous motor having a frequency which corresponds exactly to the feeding speed of the threads. However, despite the additional expenses, the starting of the winding operation by means of a clutch remains unsatisfactory even in this arrangement because, upon putting the auxiliary drive out of action, a drop of the tube speed, even if minor, cannot be prevented, so that, after a successful start, the thread finally breaks again.

A considerable drawback of the known axial winders is also that a separate drive with an additional speed regulating device is necessary for each bobbin carrier. Such variable speed drives are usually supplied with direct current. They substantially comprise a variable speed DC motor, an electric speed regulator with a controllable rectifier, and the speed control device which, in its turn, includes a hunting arm control or a thread speed measuring and transmitting device.

In order to meet the recently usual requirements for substantially higher weights of the packages, as well as for more threads in one station (once two, now four to eight bobbins) and higher speeds, a simple bobbin carrier shaft and a corresponding drive are no more sufficient. It is necessary to associate each spinning section with two to four complete winding units, each with separate variable speed control drives, even though all threads of a spinning section are fed in simultaneously, and to also simultaneously comply with the same initial conditions. A mechanical interconnection of the bobbin drives must be left out of consideration. A common drive of two to four bobbins is desirable, however, in order to save costs and is even necessary in view of the requirements of automation.

SUMMARY OF THE INVENTION

As already mentioned above, the present invention is based on the problem of providing preliminary conditions, in particular, for electric drives, in order to better comply with the requirements concerning higher winding speeds, a greater flexibility of the material, and a higher degree of automation.

In considering these requirements, the present invention starts from electric-motor-driven winding devices, particularly for winding synthetic fibers or the like, operating at constant speeds and comprising a double-current, i.e., a DC-AC machine which, in itself, is well-known. In axially driven winders, this double-current machine is substituted for the usual otherwise variable speed DC motor and in surface driven winders, as well as for feed rollers, it is substituted for a synchronous motor. With both kinds of current, the double-current machine operates both as a motor and a generator. In a preferred embodiment of the invention, the double-current machine substantially comprises a variable-speed DC motor whose armature shaft, in addition to the commutator, carrier several slip rings symmetrically connected thereto so that a symmetrical speed-proportional AC voltage is applied to the slip rings, with a frequency corresponding to the mechanical rotational speed of the shaft, the AC voltage having two, three or six, but preferably three, phases.

In view of the considered field of application, attention is directed primarily to a double-current machine for use in axially driven winders. In accordance with the invention, the machine is designed so that a mains-powered driving motor is connected to the line through a rectifier controlled by a speed-control equipment. The motor drives a bobbin carrier, if necessary, through an interposed transmission, and for driving the traverse system, the polyphase alternating voltage from the terminals is applied to a synchronous motor driving the traverse system directly, or through a variable-speed transmission.

According to a development of the invention, a throw-over switch is provided between the driving motor and the synchronous motor, permitting the drive of the synchronous motor for the traverse system either off of the driving motor or from a separate AC power supply.

In conformity with this switching arrangement, a further feature of the invention may be seen in that, while the synchronous motor is driven by the driving motor, a precision winding is obtained on the bobbin, and while the synchronous motor is supplied directly from the line, a scramble winding is produced.

It is common to these two possibilities that after the DC motor driving the bobbin carrier has been accelerated to normal speed, the DC current supply is temporarily cut off by means of a special switch and instead, external line voltage is applied to the slip rings input of the motor, whereupon, after the winding operation has started, a new actuation of the switch restores the supply of the driving motor with DC current.

According to a further development of the invention, the controllable rectifier cooperating with the variable-speed control members simultaneously supplies a plurality, preferably two, bobbin carriers or winders running in angular synchronism, and either the driving motor of a first winder is DC operated, while the driving motors of further winders are powered with polyphase voltage from the first driving motor, or all of the driving motors of the bobbin carriers are supplied with the controllable DC current, their polyphase outputs being connected in parallel and balance resistors being provided in their armature voltage lines.

In still another embodiment of the axial-drive variant of the invention, a controllable rectifier cooperating with the variable speed control members supplies a single main driving motor designed as a double-current machine, and individual driving motors are provided for each winder, the said motors being driven in angular synchronism by the polyphase voltage produced in the main driving motor.

In accordance with the basic inventive idea, the proposed solution is also applied to the surface-drive variant of the invention and to the drive of feed rollers. To this end, the drive cylinders are driven by motors which are designed as double-current motors, the supply of DC current serves to the acceleration of the drive cylinders to normal speed and after reaching this speed, the driving motors may be switched over by means of two parallel switches to an external polyphase power supply having the corresponding frequency. The synchronously running motors are provided, in accordance with the invention, with means, such as resistors, for adjusting the excitation to the optimum operational conditions. The driving motor, designed as a synchronous motor, may be uased as a DC power source for supplying a DC motor serving to drive the changer of the traverse motion.

Accordingly, it is an object of the invention to provide an apparatus for driving winding devices, such as a winding shaft or a winding drum for winding a bobbin, at a constant proportional speed in respect to an associated thread guide traverse system which comprises a drive motor having a rotatable shaft with an armature winding and a commutator connected to said armature for DC connection to a power source and a plurality of slip rings connected to the armature so that they provide a connection for a symmetrical polyphase AC voltage during the operation of the drive motor and wherein a synchronous motor is connected to the slip rings and is operated during the rotation of the drive motor shaft to drive the bobbin to effect the operation of a thread traverse system.

A further object of the invention is to provide a method of driving a rotatable bobbin shaft and a thread guide of a traverse system for the movement of the thread for delivery to the bobbin in proportional constant speed operation using a drive motor for the driving of the bobbin and a synchronous motor for the driving of the traverse system, which comprises operating the drive motor from a DC voltage source and in a manner such that it delivers the synchronous polyphase AC output voltage and operates the traverse system by driving it through a synchronous motor which is operated from the output voltage of the drive motor.

A further object of the invention is to provide an apparatus for driving winding shafts and like which is simple in design, rugged in construction and economical to manufacture.

For an understanding of the principles of the invention, reference is made to the following description of typical embodiments thereof as illustrated in the accompanying drawings.

Figure 1:
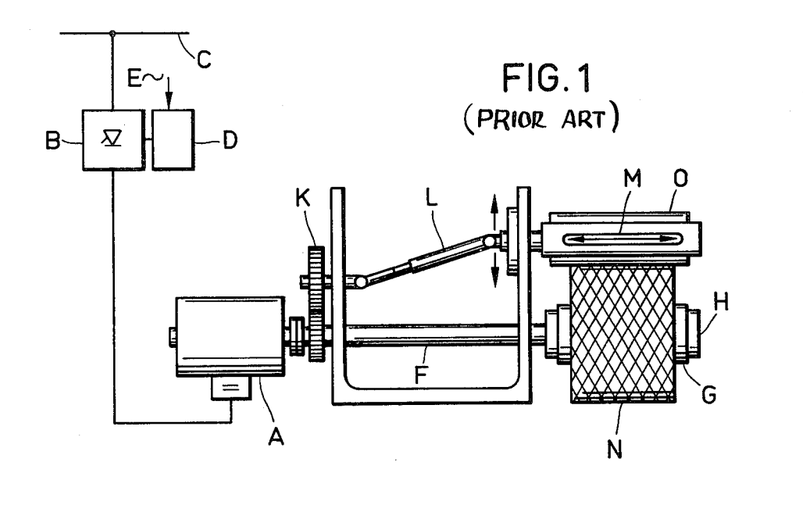
FIG. 1 is a schematic elevational view of a thread winding device in accordance with the prior art.

DESCRIPTION OF THE PRIOR ART DEVICE OF FIG. 1

According to FIG. 1, which shows a diagram of a drive arrangement known in the prior art, a DC motor A serving as a drive for the winder, is powered through a controllable rectifier B, from an AC line C in a well-known manner. The speed control device D is supplied, for example, with electric quantitites E corresponding to the measured value of the thread tension and controlling the rectifier B. The DC motor A, on the one hand, drives directly or through an appropriately dimensioned transmission, the shaft F of a bobbin holder H carrying the winding tube G and, on the other hand, a traverse system M of the traverse motion, through transmission members K (for example, a gearing, chains, or the like) and a cardan shaft L. By means of the traverse system M, the thread is reciprocated along the winding tube G so that a bobbin N is produced having rectangular edges.

The cardan shaft L or another mobile transmission member is necessary for driving a cylinder O assuring a constant spacement of the traverse system M from the bobbin surface.

DESCRIPTION OF THE PREFERRED EMBODIMENTS

Figure 2:
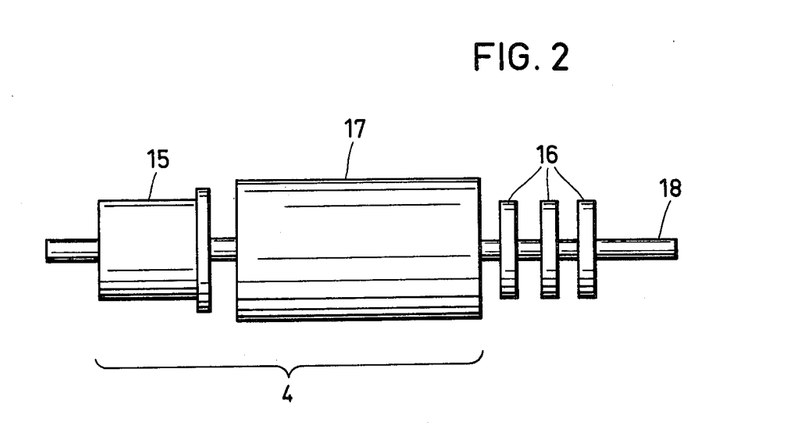
FIG. 2 is an elevational view of a drive motor for use in a winding device constructed in accordance with the invention.
Figure 3:
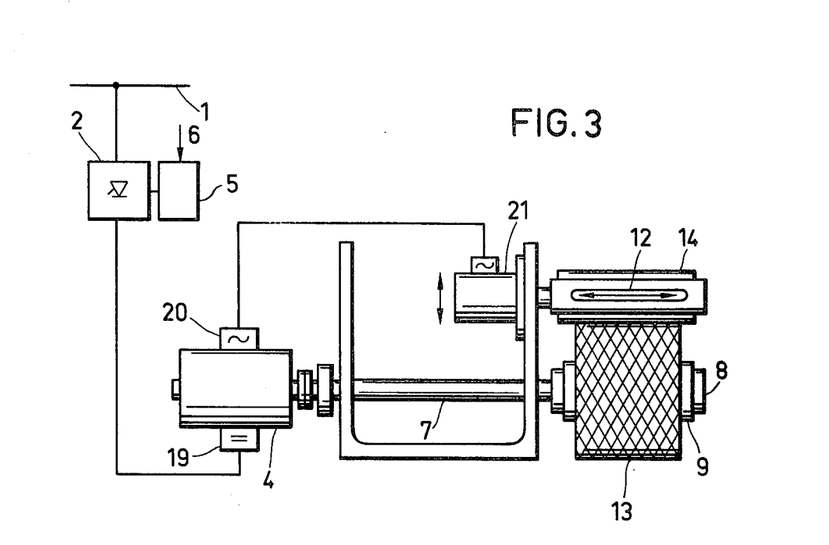
FIG. 3 is a schematic elevational view of a winding device in accordance with the invention.

Referring to the drawings in particular, the invention as embodied therein in FIGS. 2 and 3, comprises an axial winder for winding thread on a bobbin 13 and which is of a type similar to that shown in the prior art showing of FIG. 1.

In accordance with the invention, the winding device comprises a drive motor, generally designated 4, which is dissimilar from the drive motor A of the prior art shown in FIG. 1, and comprises a combined DC motor and AC generator which comprises the usual commutator 15 for connecting an armature 17 to a source of direct current and, in addition, it includes slip rings, in this instance 3, which are mounted on the same shaft 18 as the armature 17. The slip rings 16 are connected to the armature winding 17 in a manner such that a symmetrical polyphase alternating current voltage is supplied to the rings 16. Thus, the DC motor is changed into a double current machine which is a DC motor and an AC synchronous generator. The operating conditions are determined only by the mechanical torque at the shaft 18.

Referring to the various embodiments shown in FIGS. 2 to 10, motor 4 has terminal box 19 with terminals which are connected to the commutator brushes provided for the DC current. The terminals in a box 20 are connected to the slip ring brushes and, consequently, comprise the polyphase output. The polyphase AC voltage which, during the operation of the machine is applied to slip rings 16 (FIG. 2), is characterized by a frequency directly proportional to the mechanical rotational speed of shaft 18. Therefore, the DC voltage and the AC voltage are in a fixed proportion to each other.

The diagram of FIG. 3 shows how the cardan shaft L used in the prior art for the mechanical drive of the traverse system M (FIG. 1) becomes superfluous by using an extended DC control motor 4 (FIG. 2). Extended DC motor 4 is connected by its DC terminals 19, through a controllable rectifier 2 and control 5 having an input 6, to an external power supply 1. In consequence, shaft 18 (FIG. 2) of DC motor 4 drives bobbin holder 8, carrying winding tube 9. A synchronous motor 21 (FIG. 3) is coupled through a transmission to the thread traverse system which includes a driving shaft of a thread guide 12. Synchronous motor 21 is connected to AC terminals 20 of extended DC motor 4. Due to this, synchronous motor 21 runs in angular synchonism with driving motor 4 of the bobbin holder, and accordingly, the cardan drive L, shown in FIG. 1, and having the already described drawbacks, can be omitted.

Figure 4:
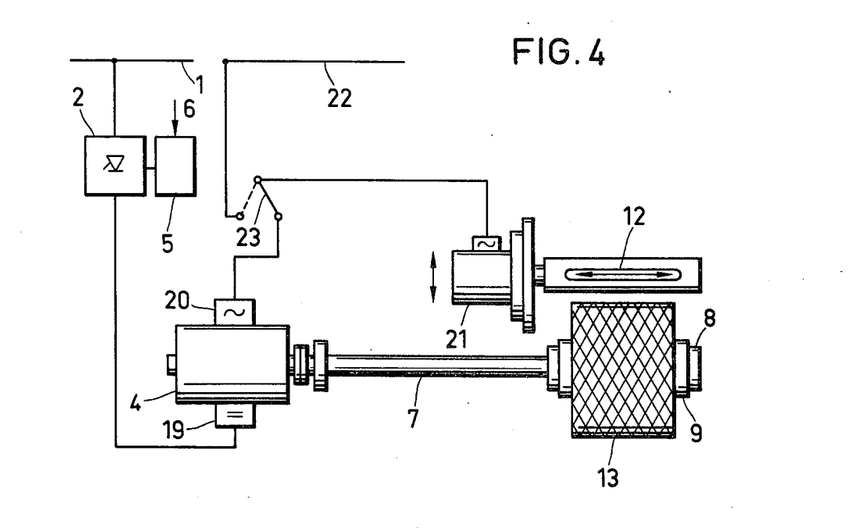
FIGS. 4 through 10 are views similar to FIG. 3 of other embodiments of the invention.

FIG. 4 shows that it is possible at any time to produce bobbins with either a precision winding or a scramble winding with the axially driven winder. A switch 23 is provided for this purpose and, in the figure, the switch is in the position precision winding. Upon switching into the indicated opposite position, synchronous motor 21 for driving traverse system 12 is powered from a separate AC line 22. The speed of the traverse motion produced by the traverse system is then given by the frequecy of this supply current. This frequency is constant and independent of the winding diameter of the bobbin 13.

The use of the extended motor 4 for the driving of an axial winder also eliminates the shortcoming of the bobbin driving motor A of FIG. 1, namely, of having no definite rotational speed at the start of the winding operation and the winding speed at the beginning is insufficient.

Figure 5:
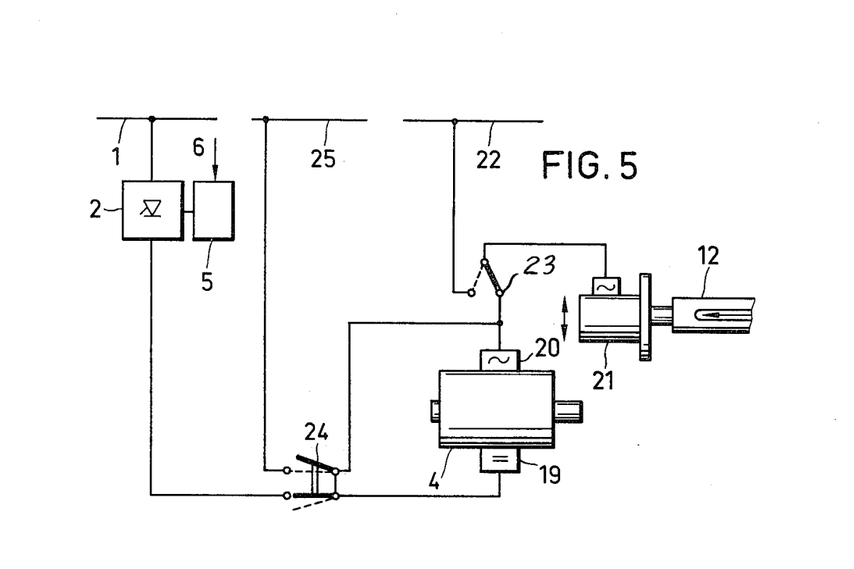

To this end and as shown in FIG. 5, a switch 24 is provided which, upon a DC acceleration of the winder to normal speed for example immediately after the bobbin change, is shortly actuated for setting the thread to the tube. Thereby, the supply of direct current into the motor is interrupted, the driving motor 4 now works as a synchronous motor, and is powered from the AC line 25. The frequency in this line 25 corresponds exactly to the optimum setting speed. In considering this adaptation, the same supply line may be used for driving the drive cylinders (all 30, 30' of FIG. 9) serving to feed the thread in. As soon as the setting of the thread to bobbin tube 9 has been terminated, switch 24 is brought into its rest or initial position, whereupon, the thread-tension or speed control provided on the winder takes over.

Figure 6:
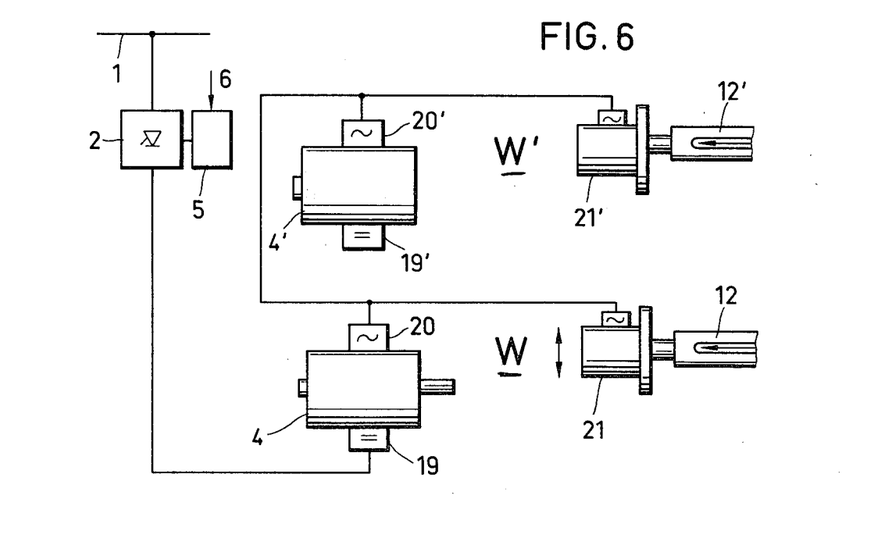

The arrangment according to FIG. 6 eliminates a further drawback inherent in the known axial winders, namely, the necessity given by the design and arrangement of providing a plurality of winders for a single spinning section, each with its own speed control and controllable rectifier.

The invention solution shown in FIG. 6 permits the use of a single variable-speed drive for driving a plurality of winding stations equal in number to the number of threads which can simultaneously be set to the tubes. The solution is represented for two winding stations. Driving motor 4 of winder W is powered from AC supply line 1 and is speed-controlled. The synchronous polyphase output 20 supplying synchronous motor 21 of changer 12 is, in this case, also the power source for main driving motor 4 of winder W' and the respective synchronous motor 21' of traverse system 12'. Naturally, the power output of motor 4, associated with the winder W must be correspondingly dimensioned.

Figure 7:
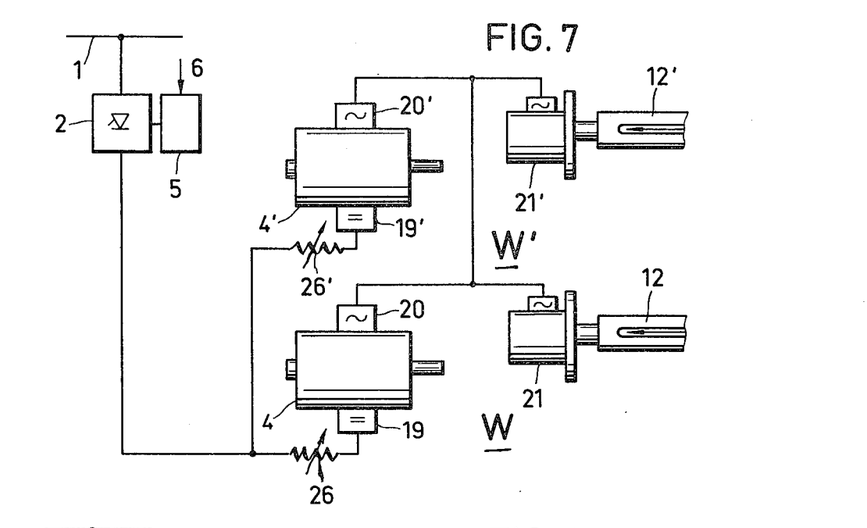

FIG. 7 shows a variant of the circuit arrangement in which a plurality of winders is supplied from a common variable-speed DC source 2, 5, 6 without the necessity of dimensioning the driving motors 4, 4', etc. for a higher power output. The driving motors 4, 4', etc. are connected by their DC terminals in parallel to terminals 19, 19', etc. and analogously, by their polyphase AC terminals, to terminals 20, 20', etc. To prevent a flow of not negligible equalizing currents resulting from the differences in machines 4, 4', etc., adjustable resistors 26, 26', etc. are provided for establishing the balance. The arrangement according to FIG. 7 is very inexpensive.

Figure 8:
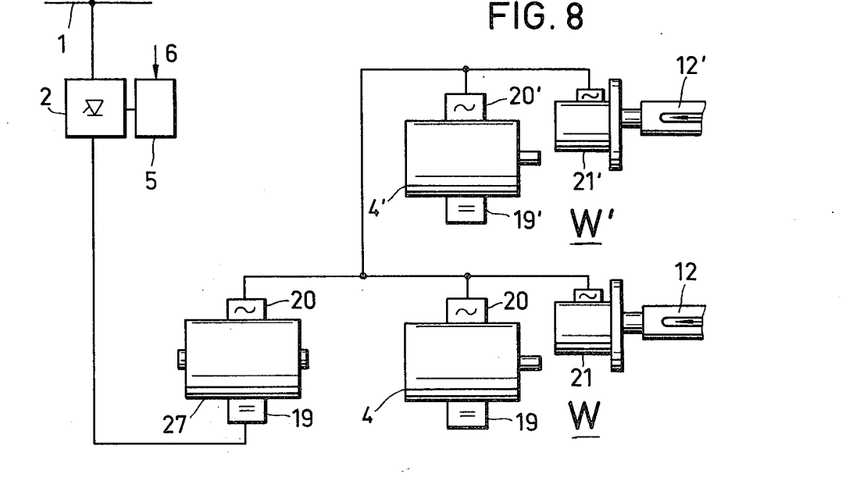

FIG. 8 shows a circuit arrangement based on the use of an extended variable-speed AC driving motor 4 having no power output at the shaft 18 (cf. FIG. 2), as a rotary converter. In this solution, a synchronism between a plurality of winders can be obtained so that a plurality of driving motors is simultaneously supplied, at their AC terminals, from terminals 20 of an electric motor 27 of the type, for example, as that of the driving motor 4 which is designed and controlled as a DC machine and also acts as an AC generator. The motor 27 functions as a converter and supplies motors 4 and 4' and 21 and 21' which are connected for synchronous operation.

In such a case, it is not necessary to supply motors 4, 4' driving the winders with direct current but instead, they can be designed as pure synchronous motors. For the same reason, DC terminals 19, 19', etc. of the winder driving motors can be omitted since motors 4, 4', etc. are powered only through terminals 20, 20', etc.

The inventive idea explained in connection with the different variants of an arrangement for axially driven winders can obviously also be applied to surface-driven winders.

A surface-driven winder for constant speed may be characterized in that a cylinder drives the wound surface of the bobbin by frictional contact at a constant speed. To obtain an exact synchronism between the individual winding stations, the cylinder is driven by a synchronous motor. The advantage of such a winder lies substantially in the fact that precise and defined conditions are created at the start of the winding operation as to the rotational speed, with the exception of unavoidable slipping between the driving cylinder and the bobbin.

The advantages of the known surface-driven winders, however, are accompanied by a number of disadvantages mostly concerning the technical particularities of the drive. Thus, for example, synchronous motors can be started only with additional means such as starter cages, damper cages, etc. Depending on the type, the motors require starting currents ten to twenty times higher relative to the rated value. Also, for a synchronous start, the motors must execute a speed jump between the asynchronous and synchronous speed. The required standard size of a synchronous motor is determined by the starting torque. For the performance in service, small output motors are usually sufficient. The necessary ten- to twenty-fold starting current endangers the life of the motors primarily in cases where because of a faulty winding, for example, the driving cylinder is subjected to several starting operations in short consecutive intervals. The windings of such motors can be protected against burning through under overload, only with the aid of relatively expensive electrical control means. In using the extended DC motor or double-current motor in accordance with the invention, however, these and other difficulties can be eliminated.

Figure 9:
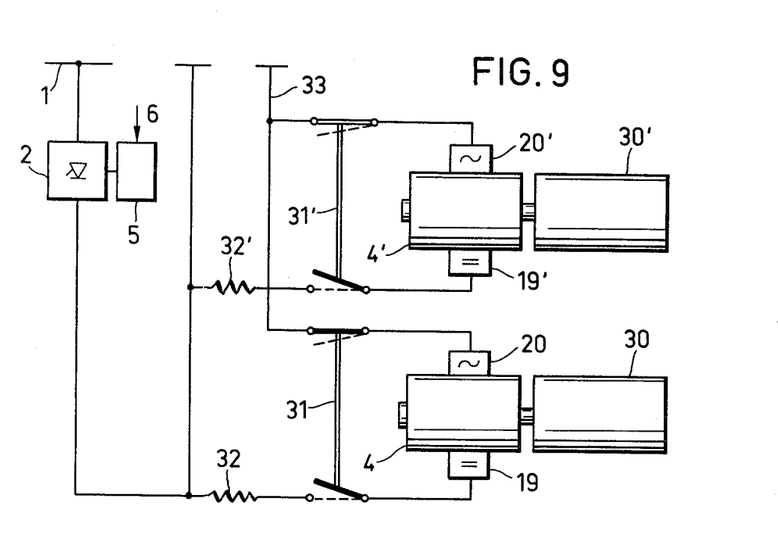

FIG. 9 shows such a circuit arrangement. The motor 4 is accelerated to normal speed by means of a central DC source or of a controllable rectifier 2, 5, 6 through a resistor 32 (32') limiting the current in the armature. After this operation, the supply is switched over from the DC line to the synchronous AC line 32 by means of switch 31 (31'). Then, motor 4 operates as a synchronous motor and it drives a rotatable drive cylinder 30.

Since motor 4, supplied from the AC line, operates as a separately excited synchronous motor, its power factor can be adjusted to the optimum value. The use of such a motor offers important economic advantages. First, at least for the bobbin drive, the otherwise necessary reverse of the ten- to twenty-fold starting current for the DC power supply becomes superfluous. Further, the additional possibility of adjusting the power factor results in lower costs of installation which is economically appreciable particularly if static frequency changers are used for the supply. Another important advantage is obtained by the use of a motor modified in accordance with the invention, namely, that with the armature of the motor, the gyrating mass of the driving cylinder can be braked down quickly and without overloading the motor.

The advantages mentioned in respect of the inventive DC motor apply also to the drive cylinders 30, 30'. Since, in operation, the drive cylinders are substantially idling gyrating masses, the inventive possibility of their acceleration to nominal speed by direct current and subsequent connecting to the AC line for synchronous running has an equally favorable effect as the further inventive possibility of using the armature voltage for their braking.

The use of the motor in accordance with the invention also increases the economy of the plant because as a rule, winding machines operate twenty four hours a day. The advantage lies in that the inventive motors permit an optimum adjustment for any mode of operation, speed and other conditions, and at the same time, results in a minimization of the losses.

Figure 10:
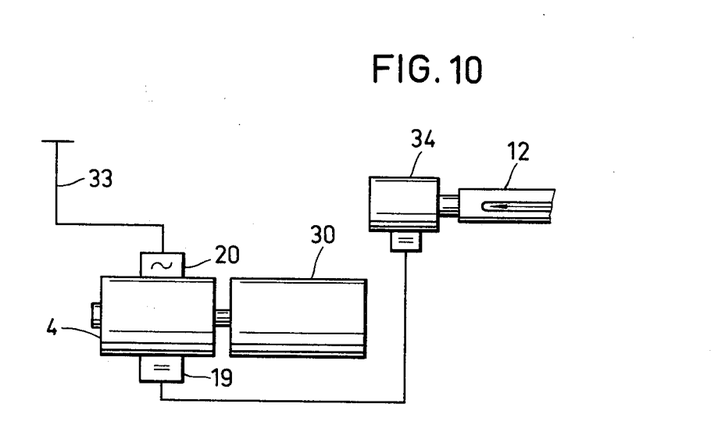

The known surface-driven winders permit only a scramble winding. Consequently, for driving a traverse system, they need a special AC circuit in addition. To eliminate so-called pattern faults, another "fault" must be superimposed to the AC voltage. In big manufacturing machines in which 20 to 50 spinning or winding stations operate conjointly, additional costs for a special supply line powering the changers is perhaps economically acceptable. In pilot plants, however, with only a small number of winding stations, it is desirable to manage without an additional AC supply circuit. This is easily possible by operating a driving motor 4 as shown in FIG. 10 in accordance with the invention as a synchronous motor and by using the direct current voltage produced at the terminals 19 for driving a DC motor 34 for the changer 12. The adjustment of such a motor to the appropriate speed is effected by means of resistors connected in the excitation of the motor 34. A corresponding disturbance due to a periodical change of the resistors is limited to a small range of about 5% to 10%. FIG. 10 shows a diagram of such a drive. The drive-cylinder motor 4 is powered with alternating current 33 supplied at the terminals 20. The direct current produced at the terminals 19 powers DC motor 34 which drives changer 12.

While specific embodiments of the invention have been shown and described in detail to illustrate the application of the principles of the invention, it will be understood that the invention may be embodied otherwise without departing from such principles.

What is claimed is:

1. An apparatus for driving winding devices, such as a device for winding thread on a bobbin using a thread traverse system for moving the thread backwardly and forwardly as the bobbin is revolved, comprising a drive motor having a rotatable shaft with an armature winding, a commutator connected to said armature winding for connecting the winding to a source of direct current and a plurality of slip rings connected to said armature winding so that a symmetrical polyphase alternating current voltage is produced at the rings during rotation of said shaft, means on said shaft for driving the bobbin, and a synchronous motor having a rotatable synchronous motor shaft connected to rotate the thread traverse system and being connected to said slip rings for receiving a polyphase alternating current output voltage from said drive motor which, during operation of said drive motor, has a frequency directly proportional to the mechanical rotational speed of said drive motor shaft whereby the traverse system is driven at a speed constantly proportional to the speed of rotation of said drive motor shaft.

2. An apparatus for driving winding devices, as claimed in claim 1, wherein said means on said drive motor shaft for driving the bobbin comprises a bobbin carrier, rectifier means connected to said drive motor for supplying DC current to said commutator, said synchronous motor shaft being directly connected to the traverse system.

3. An apparatus for driving winding devices, as claimed in claim 1, including an AC current supply, rectifier means between said AC current supply and said commutator, and a connection between said AC current supply and said slip rings and said synchronous motor including a switch for connecting said synchronous motor selectively to said slip rings and to said AC current supply.

4. An apparatus for driving winding devices, as claimed in claim 1, including an AC power main line, a rectifier between said power main line and said commutator for supplying DC voltage to said commutator, a first connection from said AC power line extending to the connection between said slip rings and said synchronous motor, and switch means in the connection between said rectifier and said commutator and said first connection for selectively and alternately connecting said drive motor to said DC rectifier means and to said AC circuit.

5. An apparatus for driving winding devices, as claimed in claim 4, including a second connection between said AC power main line and said synchronous motor and a second switch in said second connection for selectively connecting said synchronous motor to said slip rings and to said second connection.

6. An apparatus for driving winding devices, as claimed in claim 1, including an AC power source, a connecting line from said AC power source to said commutator having a rectifier therein for delivering DC voltage to said commutator, and wherein there are a plurality of synchronous motors each having a synchronous motor drive shaft connected to a traverse system and each being connected to said slip rings.

7. An apparatus for driving winding devices, as claimed in claim 6, including a second drive motor having its slip rings connected to the output slip rings of said first drive motor and to each of said synchronous motors.

8. An apparatus for driving winding devices, as claimed in claim 1, wherein said drive motor comprises a single main drive motor, and including a plurality of additional drive motors, said main drive motor having its slip rings connected in parallel to each of said additional drive motor slip rings, and a synchronous motor associated with each of said additional motors and connected to the slip rings thereof.

9. An apparatus for driving winding devices, as claimed in claim 1, wherein there are a plurality of said drive motors, each having a drive motor shaft with a friction drive cylinder for the surface driving of the bobbin, an AC power source, a rectifier between said power source and the commutators of said driving motors for supplying direct current to the commutators and switch means for selectively connecting said slip rings to said alternating current power source and disconnecting said commutators in order to permit the machines to be supplied with direct current to accelerate them to an operating speed and to operate with alternating current after being brought up to speed.

10. An apparatus for driving winding devices, as claimed in claim 9, including means in the connection of said motors for permitting adjustment of their excitations to vary their operating speeds.

11. A method for rotating a thread winding shaft at a constant rotational speed in proportion to a rotatable part of a thread traverse system, using a combined AC-DC motor generator device including an armature connected to a communtator for a DC connection and connected to a slip ring for an AC connection and using a seperate drive motor for the thread traverse system, comprising supplying alternatively and selectively AC or DC power to said combined AC-DC motor generator through the respective AC or DC connection, rotating the winding shaft by the combined AC-DC motor generator at a predetermined speed, generating a power at the connection which is not connected to the supply power, selecting a drive motor for the traverse system corresponding to the generated power, and delivering the generated power to the drive motor to drive the motor of said traverse system, at a speed in proportion to the power generated and in order to drive said traverse system at a speed proportional to the speed of rotation of said winding shaft.

* * * * *